(12) United States Patent
Noda

(10) Patent No.: US 7,582,994 B2
(45) Date of Patent: Sep. 1, 2009

(54) ELECTRIC ACTUATOR

(75) Inventor: Tatsuya Noda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/141,470

(22) Filed: Jun. 18, 2008

(65) Prior Publication Data

US 2008/0315729 A1 Dec. 25, 2008

(30) Foreign Application Priority Data

Jun. 20, 2007 (JP) ............................. 2007-162362
Sep. 25, 2007 (JP) ............................. 2007-246649

(51) Int. Cl.
*H02K 9/06* (2006.01)
(52) U.S. Cl. .......................... 310/60 R; 310/58; 74/640
(58) Field of Classification Search .............. 310/60 R, 310/20, 58; 414/2; 180/8.1; 74/460, 640; *F16H 1/32; B25J 19/00; H02K 9/06*
See application file for complete search history.

(56) References Cited

U.S. PATENT DOCUMENTS

| 4,046,262 | A | * | 9/1977 | Vykukal et al. ................. | 414/5 |
| 4,096,766 | A | * | 6/1978 | Pardo et al. ..................... | 74/640 |
| 4,398,110 | A | * | 8/1983 | Flinchbaugh et al. ......... | 310/83 |
| 4,678,952 | A | * | 7/1987 | Peterson et al. ................ | 310/83 |
| 4,697,808 | A | * | 10/1987 | Larson et al. .................. | 482/51 |
| 5,045,015 | A | * | 9/1991 | Arad et al. ..................... | 446/355 |
| 5,334,899 | A | * | 8/1994 | Skybyk ......................... | 310/268 |
| 6,120,211 | A | * | 9/2000 | Raike ............................ | 405/79 |
| 2002/0135241 | A1 | * | 9/2002 | Kobayashi et al. ............ | 310/20 |
| 2004/0074679 | A1 | * | 4/2004 | Miyazaki et al. ............. | 180/8.1 |
| 2005/0016778 | A1 | * | 1/2005 | Kitano et al. ................. | 180/8.1 |

FOREIGN PATENT DOCUMENTS

JP 62187671 A * 8/1987
JP 03-134345 6/1991

* cited by examiner

*Primary Examiner*—Quyen Leung
*Assistant Examiner*—Naishadh N Desai
(74) *Attorney, Agent, or Firm*—Rankin, Hill & Clark LLP

(57) ABSTRACT

An electric actuator comprised of an electric motor and a wave gear speed reducer connected to the electric motor efficiently air-cools the electric motor and a wave generator of the speed reducer and obviates the need for increasing the axial length of the actuator. The wave generator has a plurality of holes penetrating in the axial direction, the holes being arranged with intervals provided in the circumferential direction. A partitioning portion between the holes constitutes a vane portion which blows air in the axial direction. An internal space wherein a coil of the electric motor is disposed is in communication with an internal space of the speed reducer, and the vane portion blows air into the internal space of the electric motor. An air cooling passage is formed in a stator of the electric motor such that air flows into the air cooling passage when the vane portion blows air.

5 Claims, 12 Drawing Sheets

ELECTRIC ACTUATOR

BACKGROUND OF THE INVENTION

1. Field of the Invention

The present invention relates to an electric actuator composed of an electric motor and a wave gear speed reducer connected to the electric motor.

2. Description of the Related Art

Hitherto, as a speed reducer, a wave gear type speed reducer has been known. This type of speed reducer includes an internal gear, a flexible annular external gear, and a wave generator which elliptically flexes the external gear to partially mesh the external gear with the internal gear. When an electric actuator is constructed by connecting a wave gear speed reducer to an electric motor, the wave generator is connected to a rotor of the electric motor, and either the internal gear or the external gear is secured to the case of the speed reducer. Thus, the other gear is rotatively slowed down as the wave generator rotates.

Conventionally, there has been known such an electric actuator with vane portions protrusively provided on a side surface of a wave generator, which side is adjacent to an electric motor, in order to cool the electric motor (refer to, for example, Japanese Patent Application Laid-Open No. H3-134345). In this electric actuator, a case of a speed reducer is extended toward the electric motor, and a stator of the electric motor is accommodated in the extended portion. Further, air is drawn in by the vane portions through an inner circumferential space of the stator (the space between the stator and a rotor) when the wave generator rotates, and then the air is blown toward an outer circumferential space of the stator thereby to air-cool the electric motor.

Desirably, the wave generator is also air-cooled because the wave generator becomes extremely hot due to the heat transferred from the external gear. However, according to the conventional example described above, only one side of the wave generator is positively air-cooled, which side is the side adjacent to the motor and has vane portions protrusively provided thereon. This arrangement makes it impossible to efficiently air-cool the wave generator. In addition, providing the vane portions protrusively on the side surface of the wave generator that is adjacent to the motor requires that the axial interval between the electric motor and the wave generator be increased to accommodate the protruding vane portions, inevitably resulting in an increased axial length of the electric actuator.

SUMMARY OF THE INVENTION

The present invention has been made with a view of the background described above, and it is an object of the present invention to provide a compact electric actuator capable of efficiently air-cooling not only an electric motor but also a wave generator of a wave gear speed reducer connected to the electric motor, while obviating an increase of an axial length.

To this end, according to the present invention, there is provided an electric actuator which includes an electric motor and a speed reducer connected to the electric motor, the speed reducer being a wave gear speed reducer comprised of an internal gear, a flexible annular external gear, and a wave generator which elliptically flexes the external gear so as to partially mesh the external gear with the internal gear, the wave generator being connected to a rotor of the electric motor, one of the internal gear and the external gear being secured to a case of the speed reducer, and the other gear being rotatively decelerated as the wave generator rotates, wherein the wave generator has a plurality of through-holes opened in the axial direction provided with intervals in the circumferential direction, a vane portion for blowing air in the axial direction is formed by a partitioning portion between the holes, and air is blown in by the vane portions, thereby air-cooling the electric motor.

According to the present invention, the air blown in by the vane portion air-cools the electric motor and the air blown in by the vane portion also flows through the holes formed in the wave generator. Thus, the wave generator is also efficiently air-cooled. Further, the partitioning portion between the holes formed in the wave generator constitutes the vane portion, which is different from the one in which the vane portions are protrusively installed on the side surface of the wave generator, which side surface is adjacent to the motor, so that the vane portions do not lead to an increased axial interval between the electric motor and the wave generator. This arrangement makes it possible to obviate an increase of the axial length of the electric actuator.

The wave generator is generally comprised of an elliptical cam and a flexible ball bearing which is externally fitted to the cam. In the wave generator, the elliptical cam is provided with the aforesaid holes and the aforesaid vane portions. Meanwhile, when the external gear is elliptically flexed so as to be partially meshed with the internal gear, the elliptical cam is subjected to a large reaction force in the direction of the elliptical long axis thereof. For this reason, desirably, at least one of the width in the circumferential direction of the vane portion formed on a portion which matches the elliptical long axis of the elliptical cam and the width in the radial direction of an outer circumferential portion which matches the elliptical long axis of the elliptical cam is set to be larger than the width in the circumferential direction of the vane portion formed on a portion which matches the elliptical short axis of the elliptical cam or the width in the radial direction of an outer circumferential portion which matches the elliptical short axis of the elliptical cam, thereby increasing the rigidity of the elliptical cam in the direction of the elliptical long axis. With this arrangement, it is possible to restrain the elliptical cam from developing compressive deformation in the direction of the elliptical long axis due to a reaction force acting on the elliptical cam. This makes it possible to restrain the external gear from failing to successfully mesh with the internal gear.

Further, in the present invention, preferably, an internal space of the electric motor wherein a coil is disposed is in communication with an internal space of the speed reducer and air flows into the internal space of the electric motor by air directed by the vane portion of the wave generator. This arrangement directly air-cools the coil disposed in the internal space of the electric motor, leading to further improved cooling performance of the electric motor. Further preferably, an air cooling passage is formed in the stator of the electric motor, and air flows through the air cooling passage by the air directed by the vane portion of the wave generator. This allows the stator to be efficiently air-cooled.

Meanwhile, the direction of the air blown in by the vane portion of the wave generator switches between the direction toward the electric motor from the speed reducer and the direction toward the speed reducer from the electric motor, depending on whether the wave generator or the electric motor rotates in the forward direction or the reverse direction. If the rotational direction of the electric motor repeatedly switches between the forward direction and the reverse direction at short intervals, hot air moves back and forth between the electric motor and the speed reducer. This resultantly restrains the inflow of outside air into the electric motor, preventing the electric motor from being successfully air-cooled.

Therefore, in the present invention, an air passage in communication with a portion wherein the wave generator is disposed is preferably provided with a one-way valve. Thus, only when the electric motor rotates in either the forward direction or the reverse direction, air flows in one direction which corresponds to the particular rotational direction. Therefore, even if the rotational direction of the electric motor repeatedly switches between the forward direction and the reverse direction at short intervals, hot air will not move back and forth between the electric motor and the speed reducer. Thus, outside air is securely introduced into the electric motor to air-cool the electric motor.

DESCRIPTION OF THE PREFERRED EMBODIMENTS

Figure 1:
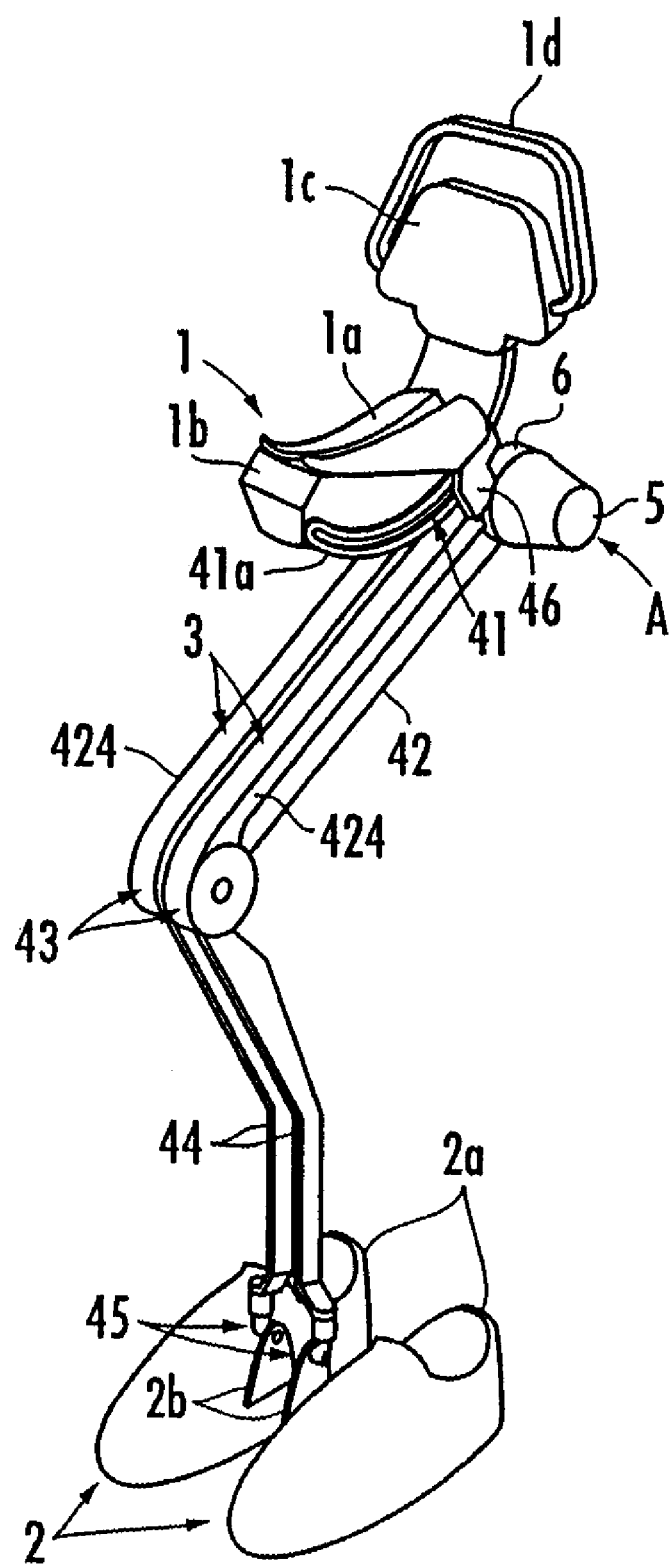
FIG. 1 is a perspective view of a walking assisting apparatus equipped with an electric actuator of an embodiment of the present invention.
Figure 2:
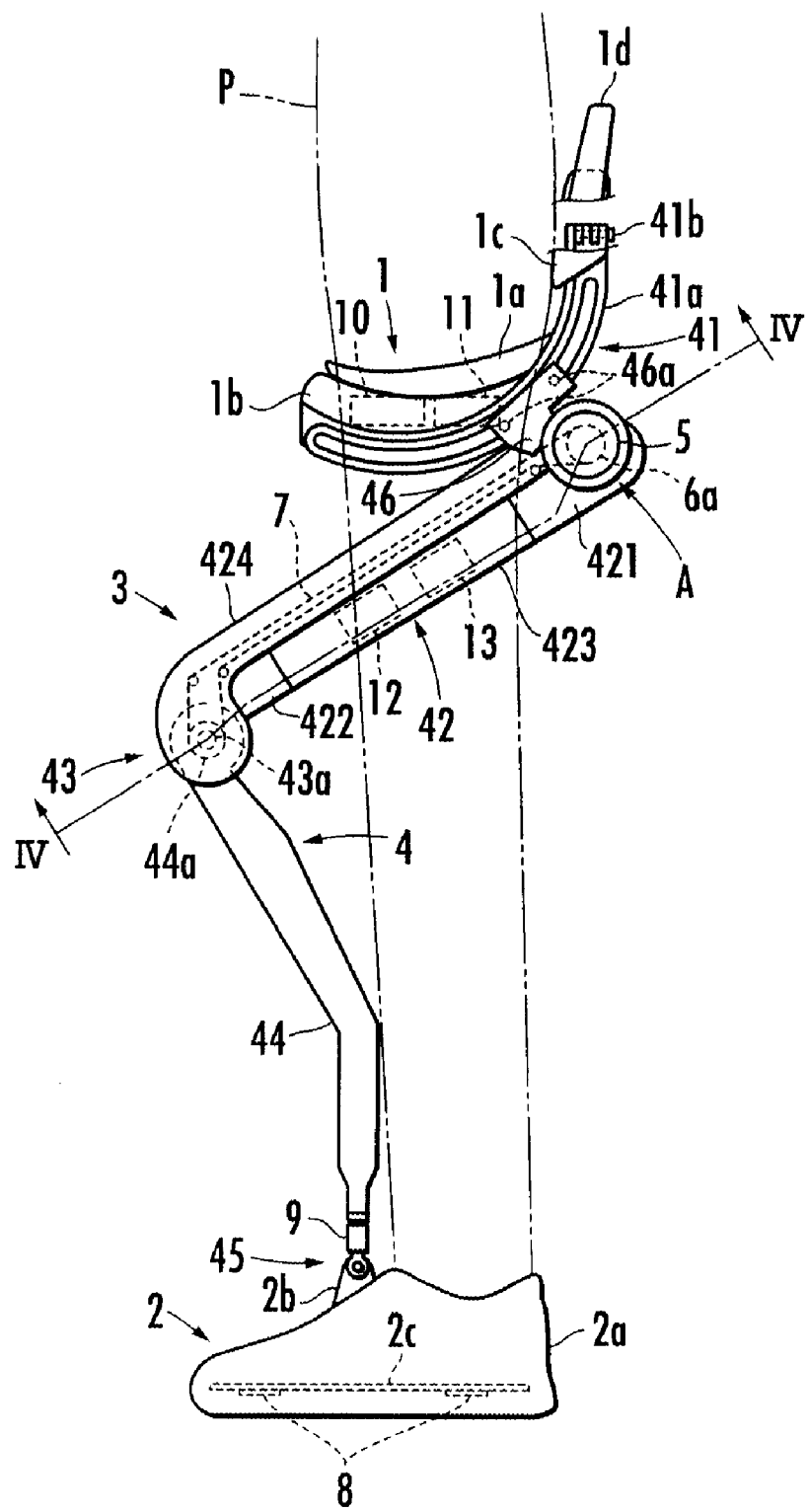
FIG. 2 is a side view of the walking assisting apparatus shown in FIG. 1.
Figure 3:
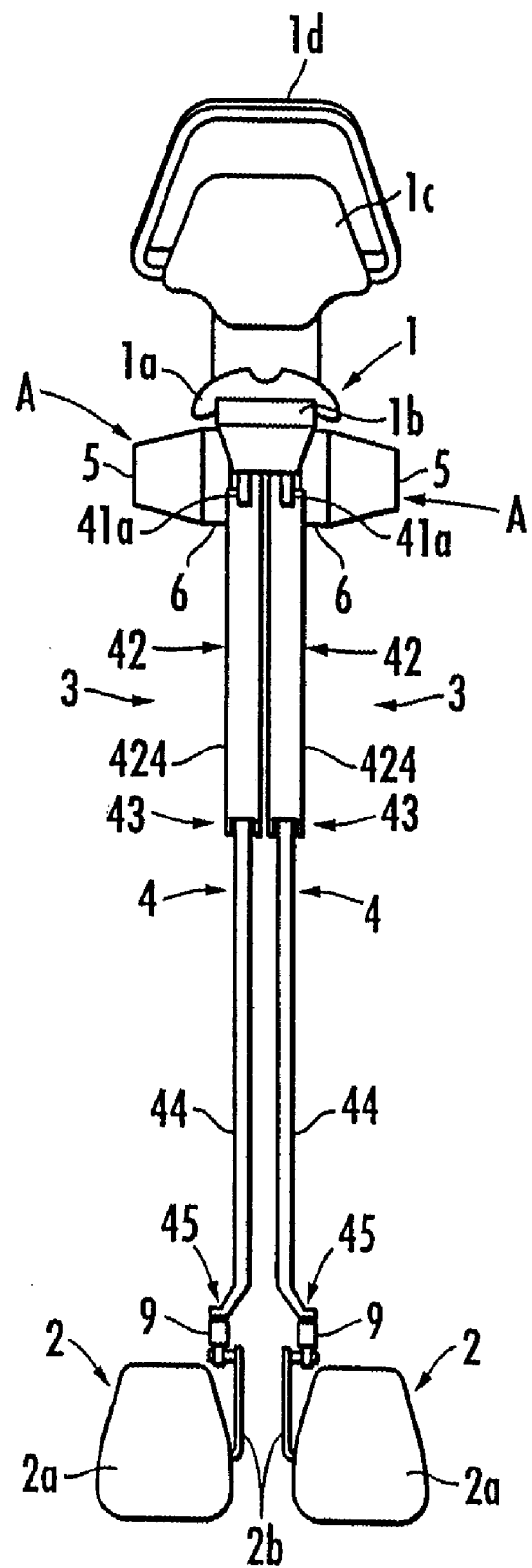
FIG. 3 is a front view of the walking assisting apparatus shown in FIG. 1.

The following will describe a walking assisting apparatus equipped with an electric actuator A according to an embodiment of the present invention. As illustrated in FIG. 1 to FIG. 3, the walking assisting apparatus has a seating assembly 1 serving as a load transferring assembly on which a user P sits astride, a pair of right and left foot-worn assemblies 2, 2 to be attached to the right and left feet of the user, and a pair of right and left leg link mechanisms 3, 3 provided between the seating assembly 1 and the right and left foot-worn assemblies 2, 2.

Each leg link mechanism 3 is comprised of a joint drive link device provided with a leg link 4, which can be bent and stretched and which is composed of a first link member 42 connected to the seating assembly 1 through the intermediary of a first joint 41 at the upper end such that the first link member 42 may swing in the longitudinal direction and a second link member 44 connected to the lower end of the first link member 42 through the intermediary of a rotary second joint 43, and an electric actuator A which drives the second joint 43. The foot-worn assembly 2 is connected to the lower end of the second link member 44 through the intermediary of a third joint 45. The second joint 43 is rotatively driven by the electric actuator A to actuate the leg link 4 in the stretching direction, that is, the direction for pushing up the seating assembly 1, thus producing a supporting force for supporting at least a part of the weight of the user (hereinafter referred to as the "weight free assisting force") The weight free assisting force generated in the leg link 4 is transferred to the body trunk of the user P through the intermediary of the seating assembly 1, thus reducing the load acting on the legs of the user P.

The seating assembly 1 is composed of a saddle-shaped seat 1a on which the user P sits, a supporting frame 1b at a lower surface thereof for supporting the seat 1a, and a hip pad 1c installed at the rising portion of the rear end of the supporting frame 1b, which rises at the rear of the seat 1a. The hip pad 1c is provided with an arched handle id which can be grasped by the user P.

The first joint 41 at the upper end of the leg link 4 has an arcuate guide rail 41a provided at the lower side of the seating assembly 1. The leg link 4 is movably engaged with the guide rail 41a through the intermediary of a plurality of rollers 46a rotatively attached to a slider 46 fixed on the upper end of the first link member 42. Thus, the leg link 4 swings in the longitudinal direction about the center of the curvature of the guide rail 41a. Hence, the center of the curvature of the guide rail 41a provides the supporting point of the swing of the leg link 4 in the longitudinal direction.

Further, an upper portion of the first link member 42 extends farther to the rear than a leg of the user P. The slider 46 engages a portion of the guide rail 41a, which portion is located farther toward the rear than a leg of the user P. This arrangement makes it possible to secure a sufficient swing stroke of the leg link 4 toward the front when the leg link 4 follows a swing of a leg of the user P toward the front, without the need for increasing the length of the guide rail 41a much.

The guide rail 41a is supported through the intermediary of a spindle 41b, which extends in the longitudinal direction, at the rising portion of the rear end of the supporting frame 1b of the seating assembly 1. Thus, the guide rail 41a is connected to the seating assembly 1 such that it may swing in the lateral direction. This arrangement allows the leg links 4 to swing in the lateral direction, enabling the user P to abduct his/her legs. The center of the curvature of the guide rail 41a and the axis line of the spindle 41b are positioned above the seat 1a, thus making it possible to prevent the seating assembly 1 from significantly tilting vertically or laterally when the weight of the user P moves.

An electric actuator A is constituted of an electric motor 5 and a wave gear speed reducer 6, which is connected to the electric motor 5 and which will be discussed in detail later. The electric actuator A is mounted on the first link member 42. As illustrated in FIG. 2, a drive pulley 6a serving as an output member of the speed reducer 6 and a driven pulley 44a secured to the second link member 44 such that the driven pulley 44a is concentric with a joint shaft 43a of the second joint 43 are connected through the intermediary of a wound transmitting member 7, such as a wire, a chain or a belt. With this arrangement, the motive power output from the electric motor 5 through the speed reducer 6 is transmitted to the second link member 44 through the wound transmitting member 7. Then, the second link member 44 swings about the joint shaft 43a relative to the first link member 42 so as to bend or stretch the leg link 4.

Each of the foot-worn assembly 2 is comprised of a shoe 2a and a linking member 2b, which is secured to the shoe 2a and which extends upward. Further, the second link member 44 of the leg link 4 is connected to the linking member 2b through the intermediary of a triaxial third joint 45. As illustrated in FIG. 2, the bottom surface of an insole 2c provided in the shoe 2a has a pair of front and rear pressure sensors 8, 8 for detecting loads acting on a metatarsophalangeal (MP) joint portion and a heel portion of a foot of the user P. Further, the second joint 43 incorporates a biaxial force sensor 9.

The supporting frame 1b of the seating member 1 includes a battery 10 and a controller 11. Further, the first link member 42 of each of the leg links 4 has a sensor amplifier 12 and a motor driver 13, which are electric components used to control the electric motor 5. The detection signals received from the pressure sensors 8 and the force sensor 9 are amplified through the sensor amplifier 12 and supplied to the controller 11. The controller 11 controls the electric motor 5 through the intermediary of the motor driver 13 on the basis of the signals from the pressure sensors 8 and the force sensor 9 so as to drive the second joint 43 of the leg link 4, thereby carrying out walking assisting control for generating the weight free assisting force.

Here, the weight free assisting force acts on the line which connects the supporting point of a swing of the leg link 4 in the first joint 41 in the longitudinal direction and the supporting point of a swing of the leg link 4 in the third joint 45 in the longitudinal direction, as observed from the side (hereinafter referred to as "the reference line"). In the walking assisting control, therefore, an actual weight free assisting force (to be precisely, the resultant force of a weight free assisting force and the force from the weights of the seating assembly 1 and the leg links 4) acting on the reference line is calculated on the basis of the detection value of a force in the biaxial direction detected by the force sensor 9. Further, the ratio of the operating load of each foot relative to the total load acting on both feet of the user P is calculated on the basis of the detected pressures of the pressure sensors 8 of each of the foot-worn assemblies 2. Then, a value obtained by multiplying a set value of a weight free assisting force, which is set beforehand, by the load ratio of each foot is calculated as a control target value of the weight free assisting force to be generated in each of the leg links 4. Then, the electric motor 5 is controlled such that the actual weight free assisting force calculated on the basis of the detection value of the force sensor 9 reaches the control target value.

Figure 4:
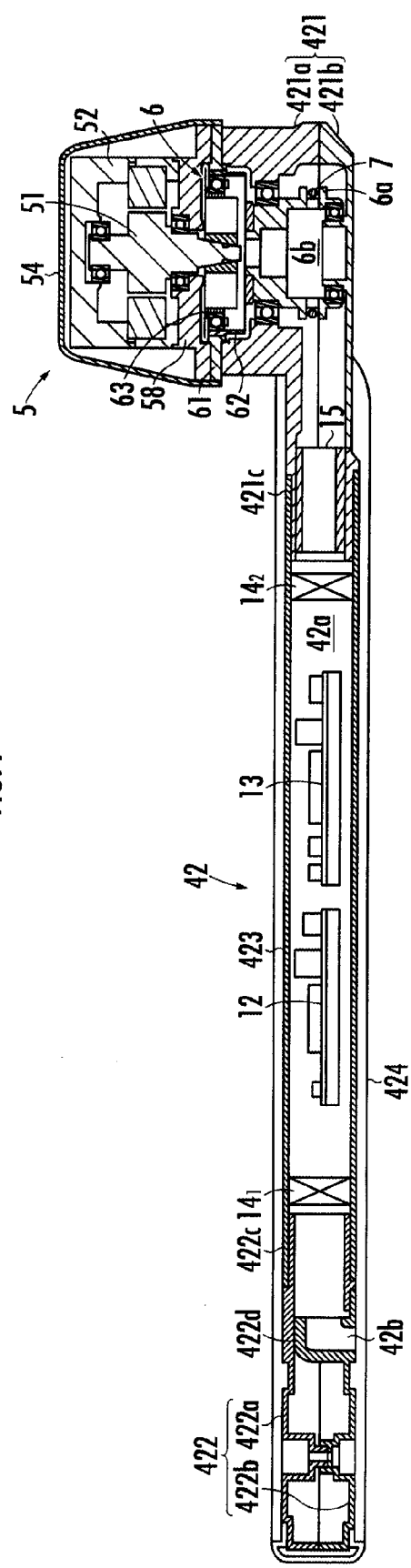
FIG. 4 is a section view of a first link member taken at the line IV-IV shown in FIG. 2.
Figure 5:
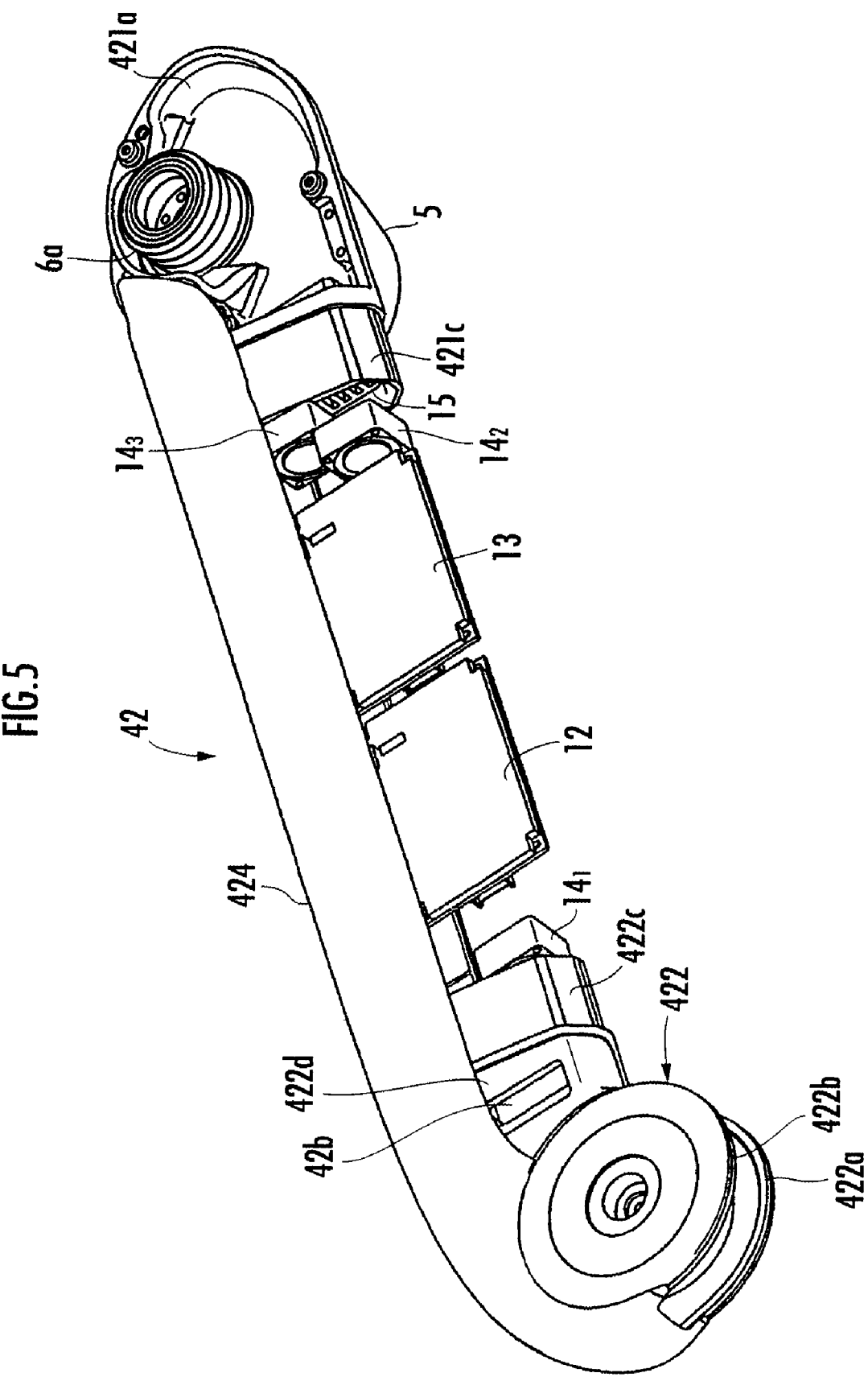
FIG. 5 is a perspective view showing the first link member with some constituent components removed.

Referring now to FIG. 4 and FIG. 5, the first link member 42 of each of the leg links 4 will be described in detail. The first link member 42 is comprised of a first case 421 at the upper end, which serves as the case of the speed reducer 6, a second case 422 at the lower end, which serves as the case of the second joint 43, an intermediate connecting pipe 423 which connects both cases, namely, the first case 421 and the second case 422, and a cover 424 disposed to cover the wound transmitting member 7 on the upper side of the connecting pipe 423. The first case 421 is constructed by connecting a lateral external half piece 421a and a lateral internal half piece 421b. The second case 422 is also constructed by connecting a lateral external half piece 422a and a lateral internal half piece 422b. Further, a pipe 421c, which fits into the upper end of the connecting pipe 423, is integrally formed with the external half piece 421a of the first case 421. Similarly, a pipe 422c, which fits into the lower end of the connecting pipe 423, is integrally formed with the external half piece 422a of the second case 422. An internal space 42a is formed in the first link member 42 such that the internal space 42a extends from the pipe 422c of the second case 422 into the first case 421 via the connecting pipe 423 and the pipe 421c of the first case 421. FIG. 5 omits the connecting pipe 423 and the internal half piece 421b of the first case 421.

In the internal space 42a of the first link member 42, the sensor amplifier 12 and the motor driver 13 are disposed adjacently to the connecting pipe 423. The electric actuator A is disposed in the first case 421. The second case 422 has an air intake 42b, which is in communication with the internal space 42a of the first link member 42. More specifically, a block 422d adjoining the pipe 422c is formed integrally with the internal half piece 422b of the second case 422, and the block 422d is provided with the air intake 42b, which opens laterally inward and which is in communication with the pipe 422c. Thus, air flows into the internal space 42a of the first link member 42 through the air intake 42b laterally from the inside of the second joint 43.

Further, the internal space 42a of the second link member 42 includes a first fan 14, disposed between the air intake 42b and the portion wherein the sensor amplifier 12 and the motor driver 13 are disposed. Furthermore, two more fans, namely, a second fan 142 and a third fan 143 and a heat sink 15 inserted in the pipe 421c of the first case 421 are disposed between the portion, where the sensor amplifier 12 and the motor driver 13 are disposed, and the portion, where the electric actuator A is disposed.

Figure 6:
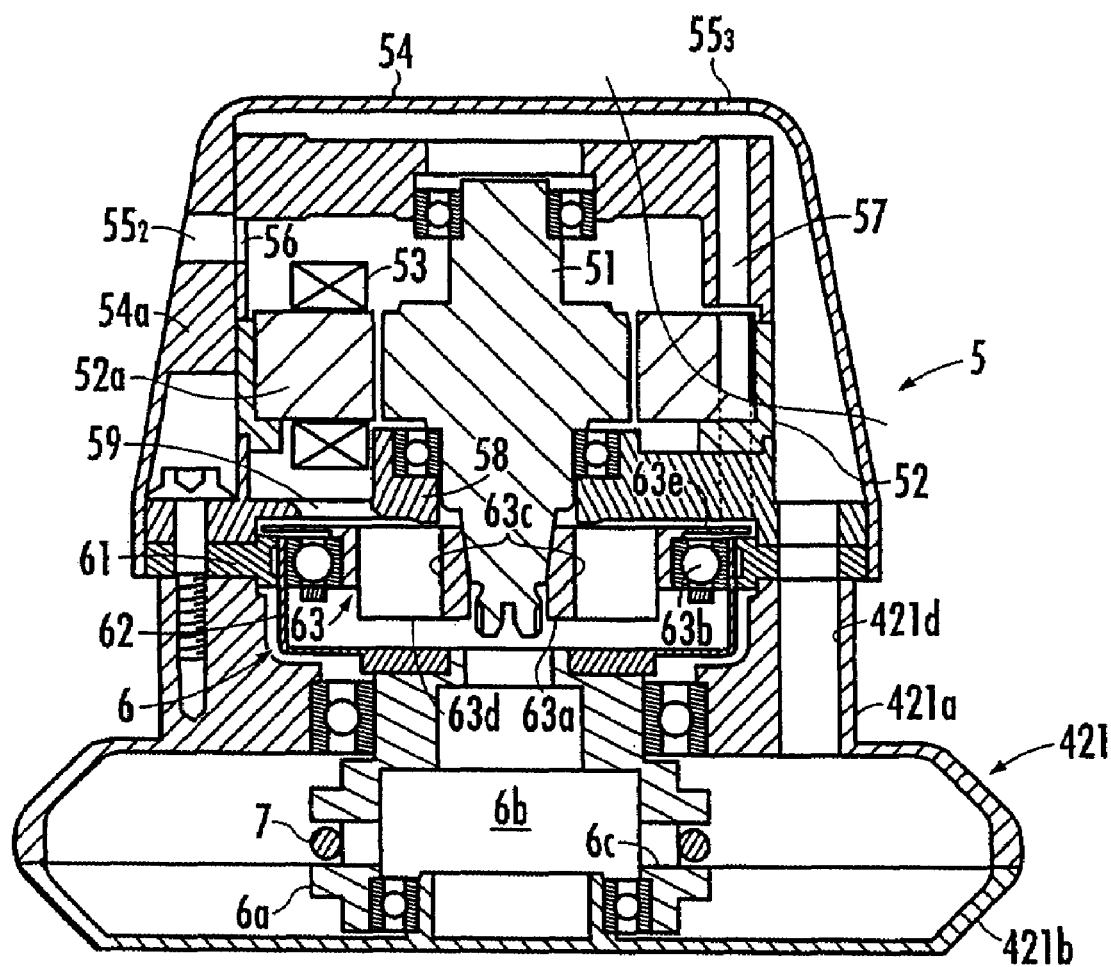
FIG. 6 is an enlarged section view of a portion of the first link member wherein an electric actuator is disposed.

As illustrated in FIG. 6, the electric motor 5 includes a rotor 51 and a stator 52 surrounding the rotor 51. The stator 52 has a stator core 52a on the inner circumference side thereof, a coil 53 being wound around the stator core 52a. A motor cover 54 is provided to cover the stator 52.

Figure 7:
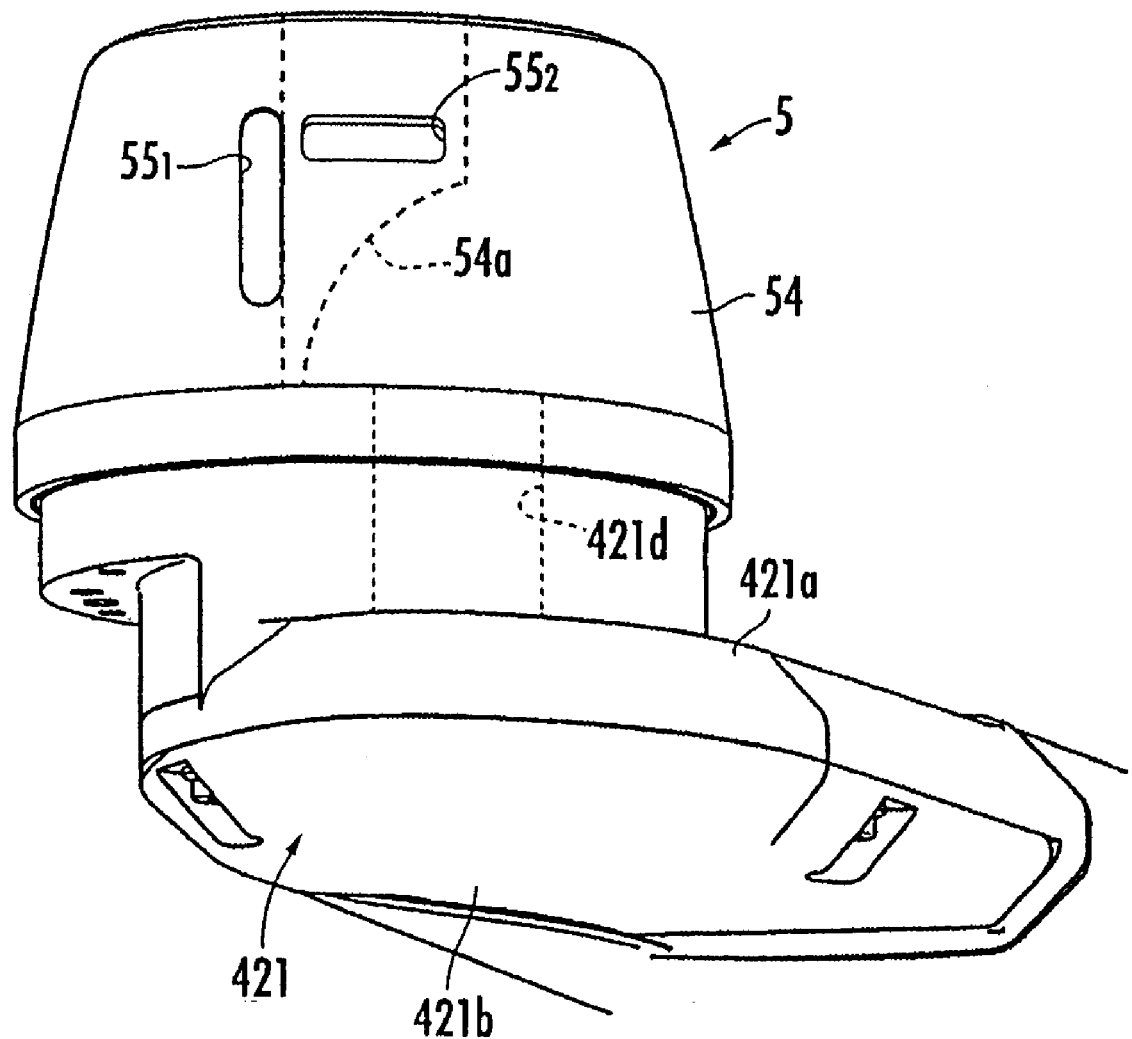
FIG. 7 is a perspective view of the portion of the first link member wherein an electric actuator is disposed.
Figure 8:
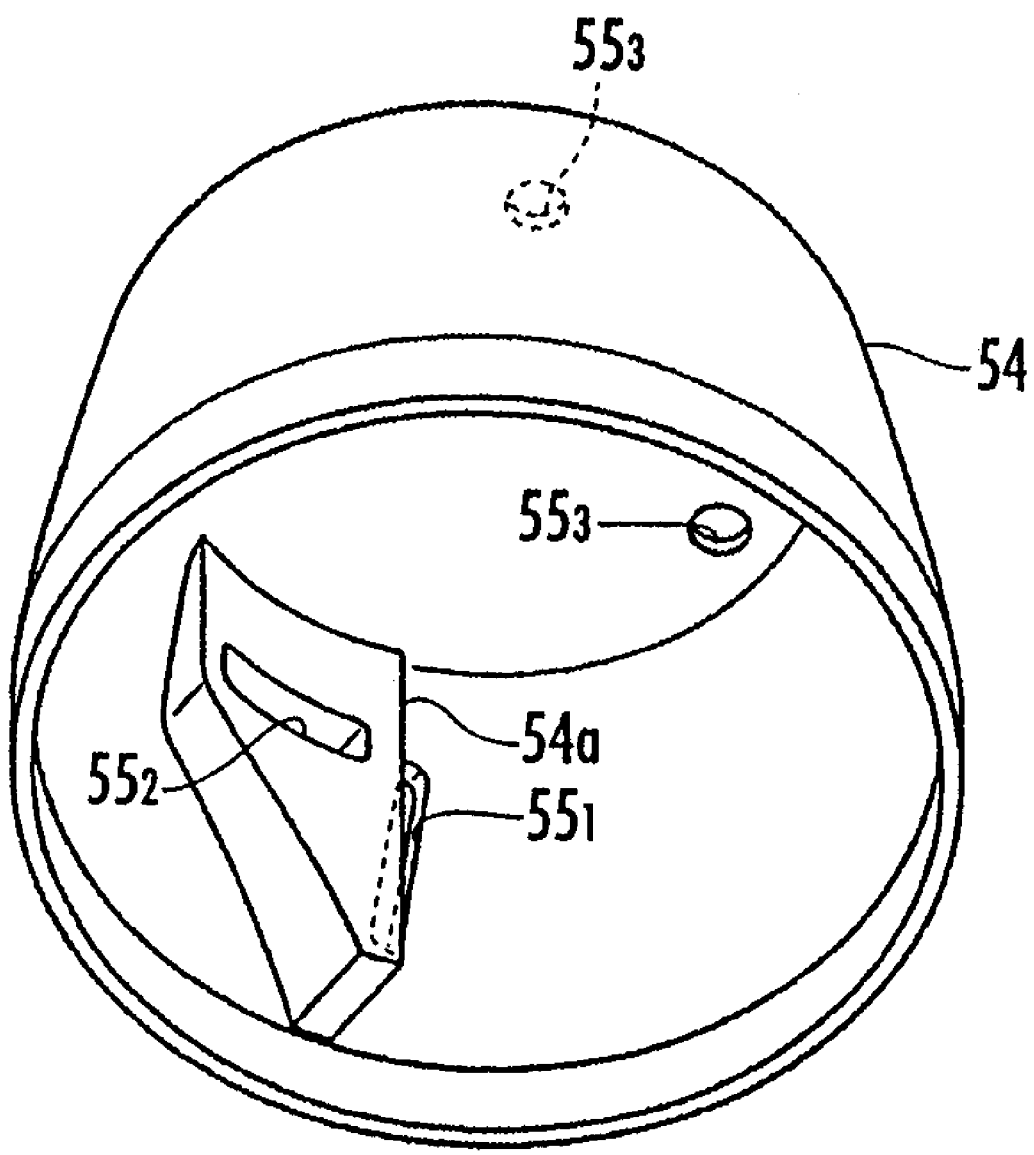
FIG. 8 is a perspective view of a motor cover of an electric motor.

Referring to FIG. 7 and FIG. 8, a partition 54a in contact with the outer circumferential surface of the stator 52 is formed at one location in the circumferential direction of the inner circumferential surface of the peripheral wall of the motor cover 54. Further, the motor cover 54 is provided with a first exhaust outlet $55_1$, which is shaped like a slot extending in the axial direction, such that the first exhaust outlet $55_1$ is adjacent to one circumferential end of the partition 54a. A second exhaust outlet $55_2$, which is shaped like a slot extending in the circumferential direction, is opened in the partition 54a in the radial direction. In addition, a plurality of third exhaust outlets $55_3$ shaped like round holes is opened in an end wall of the motor cover 54.

The external half piece 421a of the first case 421 has a communication hole 421d, which is located on the other side of the partition 54a in the circumferential direction and which brings a portion in the first case 421 of the internal space 42a of the first link member 42 into communication with a space between the stator 52 and the motor cover 54. Further, the stator 52 has a communication hole 56, which brings a space between the rotor 51 and the stator 52 into communication with the second exhaust outlet $55_2$. An air-cooling passage 57, which penetrates in the axial direction of the stator 53, is formed at a position opposing the third exhaust outlet $55_3$. Furthermore, an end piece 58 provided at the end of the electric motor 5, which end is adjacent to the speed reducer 6, has a communication hole 59, which brings a space between the rotor 51 and the stator 52, that is, the internal space wherein the coil 53 of the electric motor 5 is disposed, into communication with the internal space of the speed reducer 6, as illustrated in FIG. 6.

Figure 9:
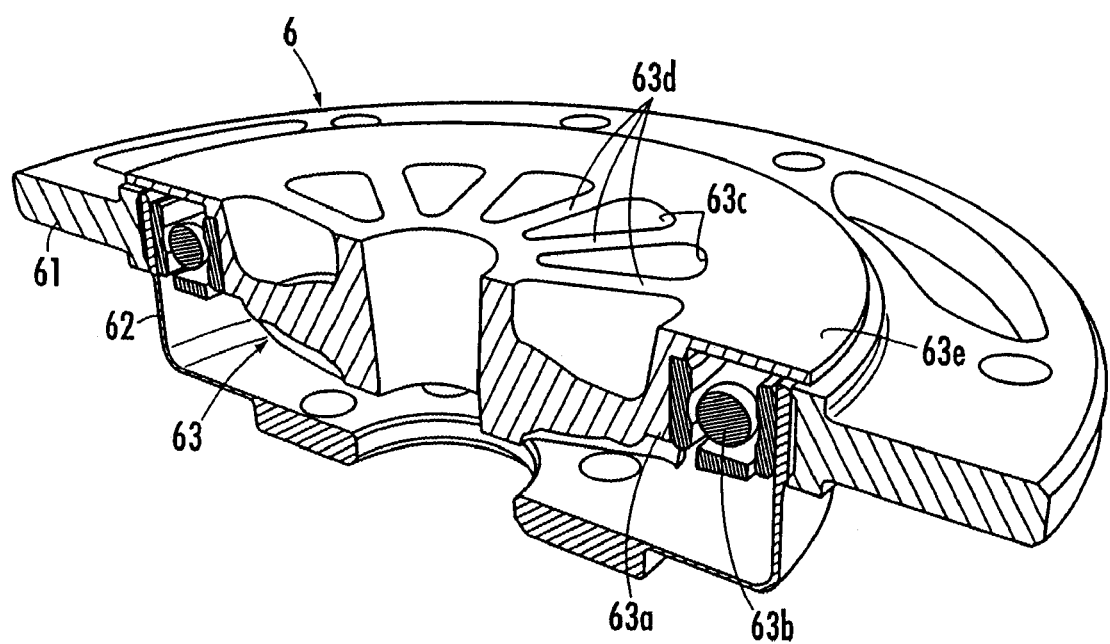
FIG. 9 is a partially cut-off perspective view of a speed reducer.

Referring to FIG. 6 and FIG. 9, the speed reducer 6 is constituted of a wave gear speed reducer equipped with a highly rigid internal gear 61 with teeth formed in the inner circumference thereof, a flexible, annular external gear 62 with teeth formed in the outer circumference thereof, and a wave generator 63, which elliptically flexes the external gear 62 to partially engage the external gear 62 with the internal gear 61. One of the internal gear 61 and the external gear 62 (the internal gear 61 in the present embodiment) is secured to the first case 421, which is the case of the speed reducer 6, while the drive pulley 6a, which is an output member of the speed reducer 6, is connected to the other gear (the external gear 62 in the present embodiment).

The wave generator 63 is comprised of an elliptical cam 63a connected to the rotor 51 of the electric motor 5 and a flexible ball bearing 63b externally fitted to the cam 63a. Inscribing the outer ring of the ball bearing 63b in the external gear 62 causes the external gear 62 to be elliptically flexed and engaged with the internal gear 61 by the long-axis portion of the ellipse thereof. The position of the engagement changes in the circumferential direction as the wave generator 63 rotates. Here, the number of the teeth of the external gear 62 is slightly smaller (e.g., by two teeth) than the number of the teeth of the internal gear 61. Thus, one rotation of the wave generator 63 causes the external gear 62, that is, the drive pulley 6a, to rotate by an angle equivalent to a difference in the number of teeth between the internal gear 61 and the external gear 62.

Figure 10:
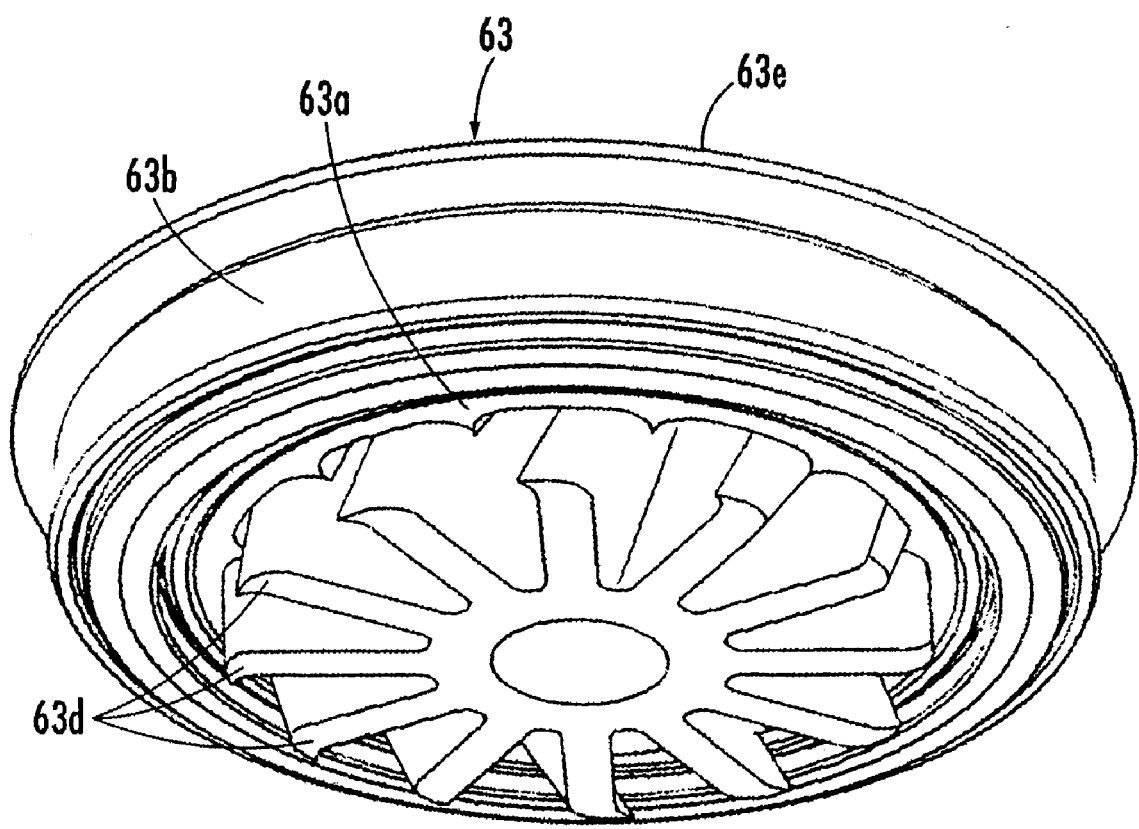
FIG. 10 is a perspective view of a wave generator.

The internal space of the speed reducer 6 is in communication with a portion in the first case 421 of the internal space 42a of the first link member 42 through the intermediary of the internal space 6b of the drive pulley 6a and a hole 6c formed in the circumferential surface of the drive pulley 6a. As illustrated in FIG. 9 and FIG. 10, the elliptical cam 63a of the wave generator 63 has a plurality of holes 63c penetrating in the axial direction with intervals provided thereamong in the circumferential direction. Each of the partitioning portions between the holes 63c and 63c is inclined in the circumferential direction with respect to the axial direction of the wave generator 63. This arrangement constitutes vane portions 63d for blowing air in the axial direction through the holes 63c by the partitioning portions.

The vane portions 63d extend beyond the ball bearing 63b in the axial direction on the opposite side from the electric motor 5 in order to enhance the air blowing performance thereof. Here, the external gear 62 need to be formed to have a certain axial length or more to secure flexibility. Therefore, even if the axial lengths of the vane portions 63d are increased, the vane portions 63d will be accommodated within the range of the axial length of the external gear 62, thus preventing an increase of the axial length of the speed reducer 6.

Further, the end of the elliptical cam 63a, which end is adjacent to the electric motor 5, is provided with a thin-sheet flange 63e, which covers, from the axial direction, the portion where the internal gear 61 and the external gear 62 mesh with each other and the ball bearing 63b. The flange 63e is adapted to prevent grease from splashing toward the electric motor 5 from the portion, where the internal gear 61 and the external gear 62 mesh with each other, and the ball bearing 63b.

Actuating the first to the third fans 141, 142, and 143 disposed in the first link member 42 causes air to be drawn through the air inlet 42b, generating an air flow in the internal space 42a of the first link member 42. The air flow moves from the air inlet 42b toward the electric motor 5. Then, the sensor amplifier 12 and the motor driver 13 disposed in the internal space 42a of the first link member 42 are air-cooled by the air flow, thus restraining the leg link 4 from becoming hot. With this arrangement, the legs of the user will not be affected by heat from the leg links 4, permitting comfortable use of the walking assisting apparatus.

The air which has become hot due to the air cooling of the sensor amplifier 12 and the motor driver 13 is cooled by the heat sink 15, and then the air flows into the space between the stator 52 of the electric motor 5 and the motor cover 54 through the intermediary of the communication hole 421d. Then, after the air makes about one round in the space, the air is exhausted through the first exhaust outlet $55_1$ of the motor cover 54. This air-cools also the electric motor 5.

When the second joint 43 is driven by the electric motor 5 through the intermediary of the speed reducer 6, the air which has passed through the heat sink 15 is blown toward the electric motor 5 through the internal space of the speed reducer 6 by the action of the vane portions 63d formed on the wave generator 63 of the speed reducer 6. A part of the air blown toward the electric motor 5 is sent into the internal space of the electric motor 5 through the communication hole 59 of the end piece 58, and exhausted from the second exhaust outlet $55_2$ of the motor cover 54 through the intermediary of the communication hole 56 formed in the stator 52. The remainder of the air blown toward the electric motor 5 is exhausted from the third exhaust outlet $55_3$ of the motor cover 54 after passing through the air cooling passage 57 formed in the stator 52. With this arrangement, the coil 53 disposed in the internal space of the electric motor 5 is directly air-cooled, and the stator 52 is also effectively air-cooled, leading to higher cooling performance of the electric motor 5.

Further, air blown by the vane portions 63d passes through the holes 63c formed in the wave generator 63, thus also efficiently air-cooling the wave generator 63. Further, each of the vane portions 63d is formed by the partitioning portion between the holes 63c and 63c opened in the wave generator 63. Therefore, unlike the aforesaid conventional example in which the vane portions are protrusively provided on the side surface of the wave generator, which side surface is adjacent to the motor, the vane portions 63d do not lead to an increase of the distance in the axial direction between the electric motor 5 and the wave generator 63. This makes it possible to obviate an increase of the axial length of the electric actuator A.

Meanwhile, when the external gear 62 is elliptically flexed to be partially engaged with the internal gear 61, the elliptical cam 63a of the wave generator 63 is subjected to a high reaction force in the direction of the elliptical long axis thereof. To prevent the external gear 62 from defectively engaging the internal gear 61, it is necessary to increase the rigidity of the elliptical cam 63a in the direction of the elliptical long axis thereof so as to restrain the elliptical cam 63a from developing compressive deformation in the direction of the elliptical long axis due to a reaction force acting thereon.

Figure 11:
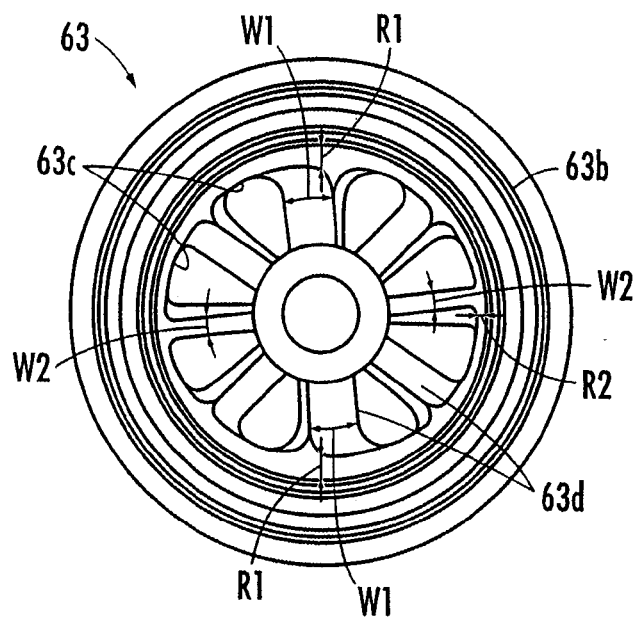
FIG. 11 is a side view of a wave generator of a second embodiment observed from an electric motor side.
Figure 12:
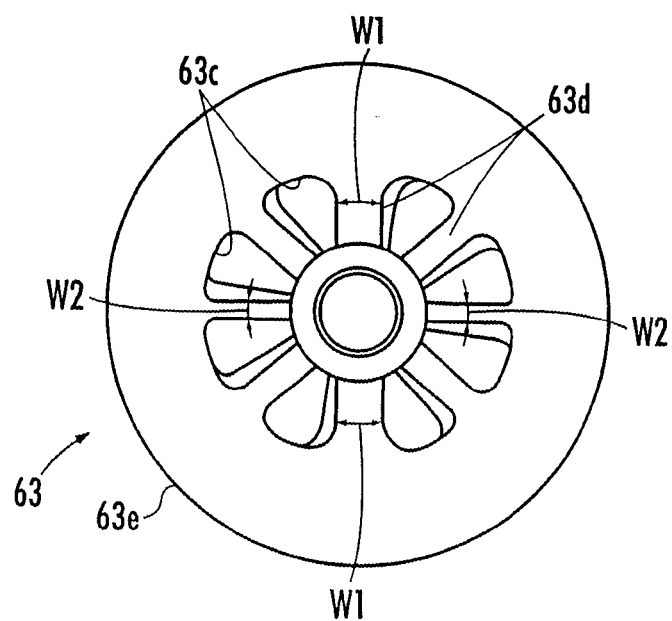
FIG. 12 is a side view of the wave generator of the second embodiment observed from the opposite side from the electric motor.

FIG. 11 and FIG. 12 illustrate a wave generator 63 of a second embodiment taking the aforesaid need into account. In the present embodiment, a circumferential width W1 of a vane portion 63d formed in the portion that matches the elliptical long axis of an elliptical cam 63a of the wave generator 63 is set to be larger than a circumferential width W2 of the vane portion 63d formed in the portion that matches the elliptical short axis of the vane portion 63d formed in the portion that matches the elliptical short axis thereof. In addition, a radial width R1 of the outer circumferential portion that matches the elliptical long axis of the elliptical cam 63a is set to be larger than a radial width R2 of the outer circumferential portion that matches the elliptical short axis thereof. This enhances the rigidity of the elliptical cam 63a in the direction of the elliptical long axis. It is therefore possible to restrain the elliptical cam 63a from developing compressive deformation in the direction of the elliptical long axis due to a reaction force acting thereon, which may cause the external gear 62 to unsuccessfully engage the internal gear 61.

It is also possible to enhance the rigidity of the elliptical cam 63a in the direction of the elliptical long axis by carrying out the setting of only the circumferential width or the radial width, that is, by setting the circumferential width W1 of the vane portion 63d formed in the area that matches the elliptical long axis of the elliptical cam 63a of the wave generator 63 to be larger than the circumferential width W2 of the vane portion 63d formed in the portion that matches the elliptical short axis, or by setting the radial width R1 of the outer circumferential portion that matches the elliptical long axis of the elliptical cam 63a to be larger than the radial width R2 of the outer circumferential portion that matches the elliptical short axis thereof.

In the above embodiments, the air which has passed through the internal space 42a of the first link member 42 is led to the area, where the wave generator 63 is disposed, via the hole 6c opened in the circumferential surface of the drive pulley 6a and the internal space 6b of the drive pulley 6a; however, the present invention is not limited thereto. For example, as in a third embodiment illustrated in FIG. 13, a half piece 421b located laterally inside a first case 421 may be provided with an opening 421e facing an internal space 6b of a drive pulley 6a, instead of forming the hole 6c in the circumferential surface of the drive pulley 6a. With this arrangement, the air coming through the openings 421e is led through the internal space 6b of the drive pulley 6a to the portion where a wave generator 63 is disposed.

Meanwhile, in a walking assisting apparatus, the electric motor 5 may be run in the forward direction and the reverse direction repeatedly at short intervals. The vane portions 63d of the wave generator 63 blow air from the speed reducer 6 toward the electric motor 5 when the electric motor 5 runs in the forward direction, while the vane portions 63d blow air from the electric motor 5 toward the speed reducer 6 when the electric motor 5 runs in the reverse direction. For this reason, if the electric motor 5 repeats the rotations in the forward and the reverse directions at short intervals, hot air goes back and forth between the electric motor 5 and the speed reducer 6. As a result, the inflow of outside air into the electric motor 5 is restrained, preventing the electric motor 5 from being successfully air-cooled.

According to the third embodiment, therefore, the internal space 6b of the drive pulley 6a, which provides an air passage in communication with the portion where the wave generator 63 is disposed, is provided with a one-way valve 16, which permits only an air flow moving from the opening 421e toward the portion where the wave generator 63 is disposed. The one-way valve 16 is composed of a cylindrical valve seat 16a vertically provided around the opening 421e and a rubber valve element 16c installed on a supporting rod 16b vertically provided in the valve seat 16a such that the valve element 16c is seated on the valve seat 16a. Further, a filter 16d serving also as a supporter for the valve element 16c is installed in the valve seat 16a.

Figure 13:
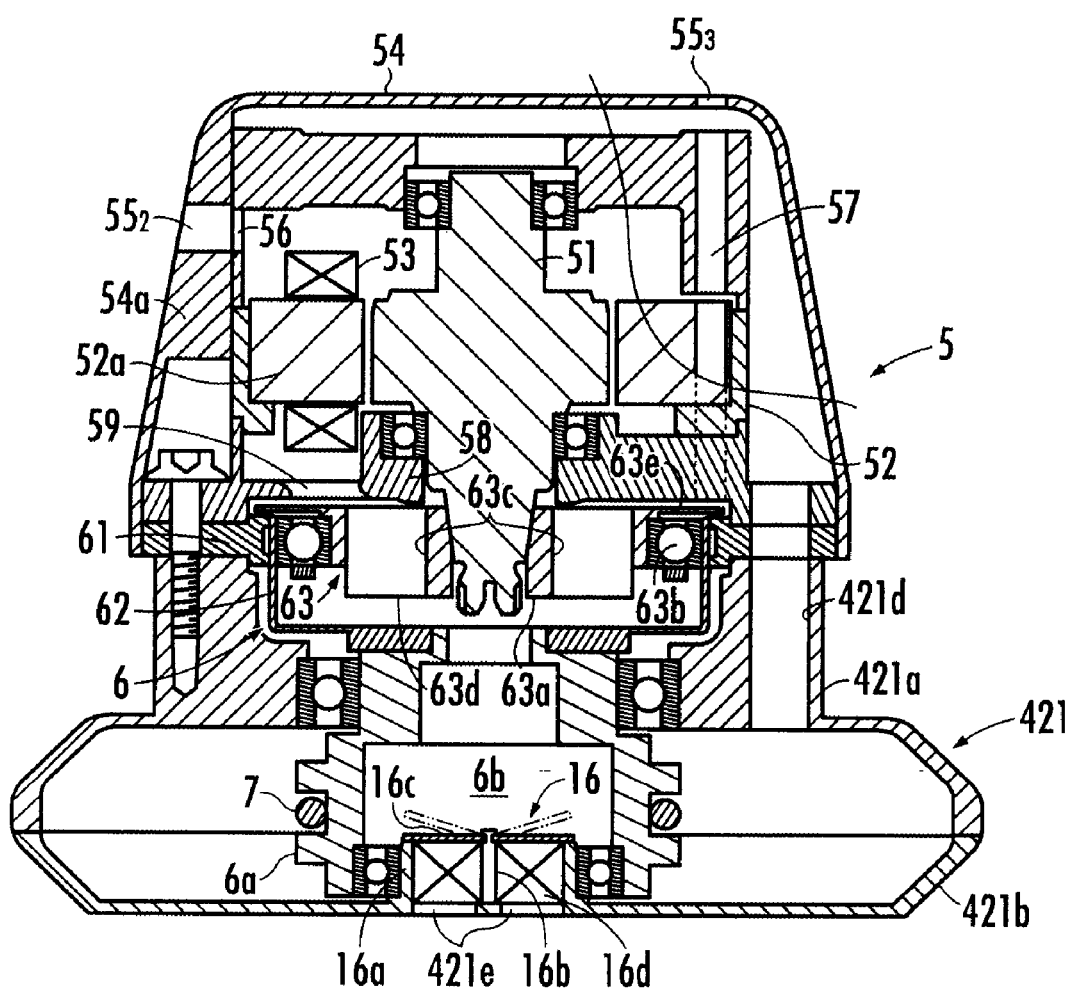
FIG. 13 is a section view of a third embodiment corresponding to FIG. 6.

With this arrangement, when the electric motor 5 runs in the forward direction, a negative pressure generated in the internal space 6b of the drive pulley 6a due to the air blown from the speed reducer toward the electric motor 5 by the vane portions 63d of the wave generator 63 causes the valve element 16c to deform and rise up from the valve seat 16a, as indicated by the virtual lines in FIG. 13, thus opening the one-way valve 16. This in turn causes the outside air flown in from the opening 421e to move toward the electric motor 5 through the intermediary of the one-way valve 16 and the wave generator 63. Meanwhile, when the electric motor 5 runs in the reverse direction, the pressure in the internal space 6b of the drive pulley 6a changes to a positive pressure, causing the valve element 16c to be pushed against the valve seat 16a and hence causing the one-way valve 16 to be closed. This blocks air blow from the electric motor 5 toward the speed reducer 6. As a result, hot air will not move back and forth between the electric motor 5 and the speed reducer 6 when the electric motor 5 runs in the forward direction and the reverse direction repeatedly at short intervals. Each time the electric motor 5 runs in the forward direction, outside air is introduced into the electric motor 5, so that the electric motor 5 is securely air-cooled.

In place of the one-way valve 16 described above, a one-way valve which permits only an air flow from the electric motor 5 toward the speed reducer 6 may be provided in an air passage adjacent to the electric motor 5 which is in communication with the portion where the wave generator 63 is disposed. This leads outside air into the opening 421e through the intermediary of the electric motor 5 and the wave generator 63 when the electric motor 5 runs in the reverse direction.

The above has described the embodiments in which the present invention has been applied to the electric actuator A provided in a walking assisting apparatus. The present invention, however, can be applied to any electric actuator installed in an apparatus besides a walking assisting apparatus as long as the electric actuator is comprised of an electric motor and a wave gear speed reducer.

What is claimed is:

1. An electric actuator, comprising:
an electric motor; and
a speed reducer connected to the electric motor,
wherein the speed reducer is a wave gear speed reducer comprising an internal gear, a flexible annular external gear, and a wave generator which elliptically flexes the external gear so as to partially mesh the external gear with the internal gear, the wave generator being connected to a rotor of the electric motor, one of the internal gear and the external gear being secured to a case of the speed reducer, and the other gear being rotatively decelerated as the wave generator rotates,
and wherein the wave generator has an elliptical cam with a plurality of through-holes opened in an axial direction with intervals provided in a circumferential direction, the elliptical cam including a vane portion for blowing air in the axial direction that is formed by a partitioning portion between the through-holes, said partitioning portion being inclined in the circumferential direction with respect to the axial direction of the wave generator, and air is blown in by the vane portion, thereby air-cooling the electric motor.

2. The electric actuator according to claim 1, wherein an elliptical cam, which is a constituent component of the wave generator, has the holes and the vane portion, and at least one of a width in the circumferential direction of the vane portion formed on a portion which matches an elliptical long axis of the elliptical cam and a width in the radial direction of an outer circumferential portion which matches the elliptical long axis of the elliptical cam is set to be larger than the width in the circumferential direction of the vane portion formed on a portion which matches an elliptical short axis of the elliptical cam or the width in the radial direction of an outer circumferential portion which matches the elliptical short axis of the elliptical cam thereby to increase rigidity of the elliptical cam in the direction of the elliptical long axis thereof.

3. The electric actuator according to claim 1, wherein an internal space of the electric motor in which a coil is disposed, is in communication with an internal space of the speed reducer, and air flows into the internal space of the electric motor by directed by the vane portion.

4. The electric actuator according to claim 1, wherein an air cooling passage is formed in a stator of the electric motor, and air flows into the air cooling passage by directed by the vane portion.

5. The electric actuator according to claim 1, wherein an air passage in communication with a portion in which the wave generator is disposed is provided with a one-way valve.

* * * * *